United States Patent Office 2,858,301
Patented Oct. 28, 1958

2,858,301

DIAZOAMINO DERIVATIVES

Pierre Petitcolas, Rouen, André Paul Richard, St.-Ouen, Oissel, Robert Frédéric Michel Sureau, Mont-St.-Aignan, René Pierre Victor Roe, Rouen, and Jean Ernest Develotte, St.-Etienne-du-Rouvray, France, assignors to Compagnie Française des Matieres Colorantes, Paris, France, a French company No Drawing. Application September 9, 1952
Serial No. 308,694

Claims priority, application France September 21, 1951

6 Claims. (Cl. 260—140)

The present invention concerns new diazo amino derivatives of the following general formula:

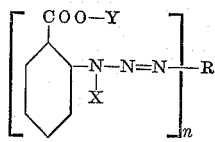

in which R represents the radical of an aromatic amine or of an amine behaving towards diazotization like an aromatic amine and having a more strongly basic character than 2:5-dichloraniline, X represents a substituted or unsubstituted alkyl or cycloalkyl radical, n represents 1 or 2 and Y designates an atom of hydrogen or of an alkali metal. It also concerns a process for their preparation.

In accordance with the present invention these new diazoamino derivatives can be obtained by starting from diazo or tetrazo derivatives of mono- or diamines having a more marked basic character than 2:5-dichloraniline, and causing them to react, in a non-acid medium, on N-substituted derivatives of anthranilic acid of the general formula:

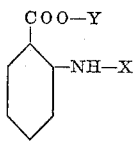

wherein X and Y have the same significance as above. They can be isolated from the reaction medium, for example, by the addition of caustic alkali or sodium chloride, or a mixture of these two compounds in accordance with the process described in the applicants' Patent No. 2,675,374. After drying at a moderate temperature under vacuum, they possess a very good stability to storage. The present invention therefore relates to diazoamino derivatives as defined above whilst the co-pending Patent No. 2,675,374 relates to one specific method of isolating the condensation products by precipitation with caustic alkali. The co-pending application Serial No. 366,866 concerns diazoamino derivatives in which the benzene nucleus may be unsubstituted or substituted by halogen atoms or by alkyl or alkoxy groups, X represents unsubstituted alkyl, aralkyl or cycloalkyl radicals containing at least three carbon atoms and R represents the residue of a diazotisable amine having a basic character equal to or less than that of 2:5-dichloraniline that is to say the dissociation constant of which is equal to or less than $3.5 \times 10^{-13}$.

Suitable diazo- or tetrazo compounds for use in the process of the present invention are, for example, those derived from aniline, the toluidines, the xylidines, the cresidines, the anisidines, from mono-halogen derivatives of the said bases, from monoacylated paradiamines substituted or not by halogen atoms or by alkyl or alkoxy groups, from benzidine, the tolidines, the dianisidines, or aminoazo compounds.

The N-substituted derivatives of anthranilic acid capable of being used for the preparation of these new diazoamino derivatives may contain substituents such as, for example, —OH, —OCH$_3$, —OC$_2$H$_5$, —COOY, —SO$_3$Y, —OSO$_3$Y, —OPO$_3$Y$_2$, —OPO$_2$Y$_2$, —COOAlk, and CON<. Specially suitable acids are N-(2-carboxyphenyl) - glycine, N - dihydroxypropyl)-2-aminobenzoic acid, N - (2' - hydroxy-3'-sulphopropyl)-2-aminobenzoic acid, 2-glucaminobenzoic acid, N-(2'-methoxyethyl)-2-aminobenzoic acid, N-(2'-ethoxyethyl)-2-aminobenzoic acid, N-(2'-carboxyphenyl)-β-amino-propionic acid, N-methyl-anthranilic acid, N-ethyl-anthranilic acid, N-butyl-anthranilic acid, N-cyclohexyl-anthranilic acid, N-(2-carboxyphenyl)-glycine-methyl-ester, N-(2-carboxylphenyl)-glycine ethyl-ester, and N-(2-carboxyphenyl)-glycinamide. These acids can be obtained, for example, either by starting with orthohalogenobenzoic acids by condensation with aliphatic or cycloaliphatic derivatives containing an amino group, or by starting with orthoamino-benzoic acids by condensation with aliphatic halogen derivatives.

The diazoamino derivatives of the present invention can be mixed with coupling components and thus serve to prepare insoluble azo dyestuffs on the fibres of textile materials and they have the advantage of splitting very rapidly on neutral steaming. This property renders them particularly valuable for printing textile fibres, since they can be developed by simple neutral steaming without necessitating the addition of volatile amines to the printing pastes. In fact, the disadvantages due to the use of acid steaming are well known and up to the present, only a very small number of diazomino compounds were known to be capable of splitting by simple hydrolysis in an alkaline medium. These new diazoamino derivatives of the present invention are therefore of great technical interest.

The invention will be more clearly understood by reference to the following examples which are purely illustrative and in which the parts by weight and by volume designate any units of weight and volume but corresponding to the same quantity of water.

*Example 1*

35.5 parts by weight of 5-chloro-2-amino-1-methyl-benzene are diazotized in the usual manner at 0–5° C. with 60 parts by volume of 21° Bé. hydrochloric acid and 17.5 parts by weight of sodium nitrite. The solution of the diazo compound is allowed to flow in half an hour under the surface of the liquid and with good agitation into a solution, maintained at −2° C. to −3° C. by external cooling and by the addition of ice and prepared from 65 parts by weight of the monosodium salt of N-(2-carboxyphenyl)-glycine, 300 parts of water and 70 parts by weight of sodium carbonate. The absorption of the diazo compound is rather rapid. After the flow has ceased, the mixture is neutralised gradually with a solution of caustic soda to clear alkalinity to thiazole yellow paper. A small quantity of insoluble products is eliminated by filtration and the residue on the filter is washed with a little water, the volume then being 1,200 parts. The diazoamino derivative is precipitated by adding 200 parts by weight of caustic soda in flakes. The temperature rises to 40–50° C. and the mixture is allowed to cool. The crystals isolated by filtration are dried at 40–50° C. In this manner 96 parts by weight of dry product are obtained.

*Example 2*

35.5 parts by weight of 4-chloro-2-amino-1-methyl-benzene are diazotized in the usual manner as in Example 1, with 60 parts by volume of 21° Bé. hydrochloric acid and 17.5 parts by weight of sodium nitrite at a temperature of 0–5° C. The final volume of the solution of diazo compound is 400 parts. This solution is allowed to flow in half an hour under the surface of the liquid and with good agitation into a solution prepared from 65 parts by weight of the mono-sodium salt of N-(2-carboxyphenyl)-glycine, 350 parts of water and 70 parts by weight of sodium carbonate. This solution is kept at −3° C. to −2° C. by external cooling by means of a refrigerating mixture and by the addition of ice. After the flow has ceased, the mixture is neutralized with caustic soda as in the foregoing example, filtered and the diazoamino derivative is precipitated by adding to the filtrate 200 parts by weight of caustic soda in flakes and 200 parts by weight of sodium chloride. It is heated to 60–65° C. for a short time to favour the formation of crystals, which, after cooling, are filtered, well pressed and dried at moderate temperature. The yield is of the order of 80%.

*Example 3*

28.5 parts by weight of 86% dianisidine are pasted at 0–5° C. in 100 parts of water and 50 parts by volume of 22° Bé. hydrochloric acid. It is diazotized by allowing 28 parts by volume of a 50% by volume solution of sodium nitrite to flow in gradually. After stirring for one hour the mixture is filtered, and the filtrate allowed to flow, under the surface of the liquid in 45 minutes into a mixture containing 54 parts by weight of the mono-sodium salt of N-(2-carboxyphenyl)-glycine, 500 parts of water, 180 parts by weight of disodium phosphate dodecahydrate and 23 parts by volume of a 48° Bé. caustic soda solution and the necessary quantity of sodium carbonate to obtain alkalinity to β-yellow. When the flow of the tetrazo compound has ceased, the mixture is neutralized to clear alkalinity to thiazole yellow. Precipitation of trisodium phosphate is brought out. It is then diluted with 800 parts of water, made alkaline with 200 parts by weight of flake caustic soda, which brings about the precipitation of trisodium phosphate, which is eliminated by filtration and washing with 14% caustic soda. The diazoamino derivative is precipitated by means of 350 parts by weight of common salt, filtered, well pressed and dried at moderate temperature. The yield is good.

*Example 4*

32 parts by weight of m-chloraniline are diazotized with 34.5 parts by weight of a solution of 50% by volume of sodium nitrite and 62 parts by volume of 20° Bé. hydrochloric acid in 100 parts of water cooled by 100 parts by weight of ice. The diazo compound thus obtained is allowed to flow under the surface of the liquid with good agitation in half an hour into a solution, cooled to −3° C. to −4° C. and prepared from 66 parts by weight of the mono-sodium salt of N-(2-carboxyphenyl)-glycine, 200 parts of water and 70 parts by weight of carbonate of soda. In the course of the flow about 100 parts by weight of ice are added. The absorption of the diazo compound takes place rapidly. At the end of the flow the mixture is rendered neutral to thiazole yellow paper with caustic soda, filtered and the slight residue left on the filter is washed three times with 50 parts of water. The volume is then 950 parts. The diazo derivative is precipitated by the addition of 200 parts by weight of caustic soda in flake form and 100 parts by weight of common salt, allowing the temperature to rise. The crystals isolated by filtration are well pressed and dried at moderate temperature. The yield reaches 85%.

*Example 5*

31.5 parts by weight of 4-chloro-2-amino-1-methoxy-benzene are diazotized as in Example 1 with 50 parts by volume of concentrated hydrochloric acid and 14 parts by weight of sodium nitrite, and the diazo compound thus obtained is allowed to flow under the surface of the liquid in half an hour, as in the foregoing examples, at a low temperature, into a solution of 54 parts by weight of the mono-sodium salt of N-(2-carboxyphenyl)-glycine, to which has been added 70 parts by weight of sodium carbonate. The precipitation and isolation of the diazo-amino derivative is effected in the same manner as in Example 1. The yield obtained is of the order of 80%.

*Example 6*

225 parts by weight of amino-azo-toluene derived from o-toluidine are dissolved under the influence of heat in 2000 parts of water and 110 parts by volume of concentrated hydrochloric acid. The solution is allowed to cool and whilst agitating a further 190 parts by volume of concentrated HCl are added. Ice is added to keep the temperature at 10° C. and it is diazotized by adding 140 parts by volume of 50% solution of sodium nitrite. At the end of half an hour, one allows this solution of diazo compound to flow under the surface of the liquid at 0° C. into a solution of the following composition: 260 parts by weight of the disodium salt of N-(2-carboxyphenyl)-glycine, 250 parts by weight of $Na_2CO_3$ and 1000 parts of water. The flow lasts an hour and the diazo derivative is completely absorbed. There is then added 1500 parts by weight of solid NaOH. A gummy precipitate is formed which is decanted or which is stirred until it crystallizes, and which is filtered and dried under vacuum at 40° C.

*Example 7*

225 parts by weight of amino-azo-toluene derived from m-toluidine are pasted under the influence of heat in 2000 parts of water and 110 parts by volume of concentrated HCl. The mixture is cooled while adding ice with stirring to bring the temperature down to 10° C., 190 parts by volume of concentrated HCl are added, and it is diazotized by the addition of 150 parts by volume of a solution of 50% $NaNO_2$. The duration of the introduction is ¼ hour and the duration of stirring one hour at 15° C. This solution of diazo compound is filtered and introduced in one hour under the liquid, at a temperature of between 0° C. and 3° C., into a solution containing 260 parts by weight of the disodium salt of N-(2-carboxyphenyl)-glycine, 250 parts by weight of $Na_2CO_3$ and 1000 parts of water. The diazo derivative is rapidly absorbed. 400 parts by weight of solid NaOH are added in discrete portions, the mixture is stirred for one hour, filtered, pressed out and dried at a moderate temperature under vacuum.

*Example 8*

486.5 parts by weight of the diazonium salt of the formula:

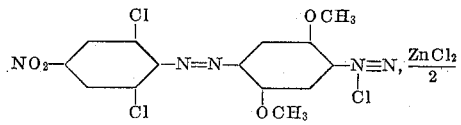

are dissolved in 20,000 parts of water at 35° C., filtered, and this solution introduced, at between 5° C. and 10° C., in an hour into a solution prepared from 260 parts by weight of the disodium salt of N-(2-carboxyphenyl)-glycine, 150 parts by weight of $Na_2CO_3$ and 1000 parts of water. The diazo derivative rapidly disappears; 400 parts by volume of 48° Bé. NaOH are introduced, then 5000 parts by weight of fine salt; the mixture is stirred for an hour, filtered, pressed and dried in vacuo at a moderate temperature.

*Example 9*

338.5 parts by weight of 4'-nitro-4-amino-2:5-dimethoxy-azobenzene hydrochloride are formed into a paste with 15,000 parts of water at 45° C. When the mixture is homogeneous, 300 parts by volume of concentrated HCl are added, and there is introduced below the surface of the liquid, in the space of 1½ hours, 1,000 parts by volume of a 10% solution of sodium nitrite. The mixture is further heated to 45–50° C. during one hour. A trace of insoluble matter is filtered off and the filtrate introduced in half an hour, at between 5° C. and 10° C., into a solution formed from 260 parts by weight of the disodium salt of N-(2-carboxyphenyl)-glycine, 200 parts by weight of Na₂CO₃ and 1000 parts of water. The compound is salted out by means of 1750 parts by weight of solid caustic soda and 4000 parts by weight of salt. The next day it is filtered, pressed and dried under vacuum at a moderate temperature.

*Example 10*

271.5 parts by weight of the amino azo compound of the formula:

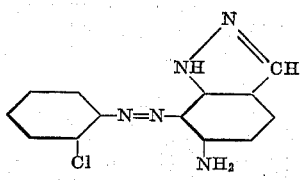

are dissolved in 3000 parts of warm water and 110 parts by volume of concentrated HCl. The solution is cooled to 5° C. by the addition of ice, a further 190 parts by volume of concentrated HCl are added and it is diazotized by introducing 140 parts by volume of a 50% NaNO₂ solution. The mixture is stirred for ¼ hour and the diazo derivative crystallises for the most part. The suspension of diazo compound is introduced into a solution formed from 260 parts by weight of the disodium salt of N-(2-carboxyphenyl)-glycine, 250 parts by weight of Na₂CO₃ and 1000 parts of water. A trace of insoluble matter is filtered off and the diazoamino derivative is precipitated by the addition of a mixture of solid caustic soda and salt. It is filtered, pressed and dried under vacuum at 40° C.

*Example 11*

300 parts by weight of 2′-nitro-4-amino-5-methoxy-2:4′-dimethylazobenzene are formed into a paste in 2000 parts of water and 150 parts by volume of concentrated HCl. The mixture is stirred overnight. The next day, a further 150 parts by volume of concentrated HCl are added and ice to keep the temperature between 5° C. and 10° C., then there is introduced under the surface of the liquid, in the space of a quarter of an hour, 140 parts by volume of a 50% NaNO₂ solution. The mixture is stirred for half an hour at 10° C., a trace of insoluble material is removed by filtration, and the solution of the diazo compound thus obtained introduced below the surface of the liquid in half an hour, at between 3° C. and 5° C., into a solution formed from 260 parts by weight of the disodium salt of N-(2-carboxyphenyl)-glycine, 250 parts by weight of Na₂CO₃ and 1000 parts of water. When the diazo derivative is totally absorbed, the solution is salted out with 2000 parts by weight of salt and 600 parts by weight of solid NaOH, the compound precipitated in fine reddish brown crystals is filtered, pressed and dried under vacuum at a moderate temperature.

*Example 12*

15 parts by weight of 4-chloro-2-amino-1-methyl-benzene are diazotized, between 0 and 5° C., with 50 parts by volume of concentrated hydrochloric acid, 100 parts of water to which ice has been added and 7 parts by weight of sodium nitrite. The solution of the diazo compound is allowed to flow in 30 minutes under the surface of the liquid of a solution prepared from 25 parts by weight of N-(2-carboxyphenyl)-glycine-ethyl-ester of the formula:

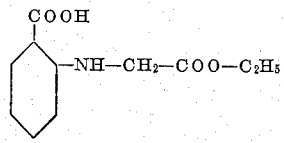

and 55 parts by weight of Na₂CO₃ dissolved in 250 parts of water; this solution is cooled to 0° C. Absorption of the diazo compound is instantaneous. The mixture is rendered alkaline to thiazole yellow paper with 90 parts by volume of a 30% by volume solution of caustic soda and filtered. The volume is then about 1,200 parts. The diazoamino derivative is precipitated by gradually adding 125 parts by weight of solid caustic soda in flakes and 150 parts by weight of sodium chloride. The temperature is 30° C. After two hours of stirring, a further 100 parts by weight of caustic soda are added. After stirring for a few hours, the very well formed crystals are filtered, pressed and dried at a moderate temperature. The yield is very good.

*Example 13*

15 parts by weight of 4-chloro-2-amino-1-methylbenzene are diazotized as in the preceding example. Half of the solution of the diazo compound obtained is allowed to flow, for half an hour, under the surface of the liquid of a solution containing 24 parts by weight of N-(2-carboxyphenyl)-glycinamide of the formula:

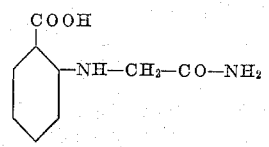

15 parts by volume of a 30% by volume solution of caustic soda and 50 parts by weight of Na₂CO₃ in 350 parts of water, keeping the temperature at 0° C. Then 20 parts by volume of a 30% by volume solution of caustic soda are added and the remainder of the solution of the diazo compound is introduced. The volume is then 900 parts. The absorption of the diazo compound is instantaneous. The mixture is rendered alkaline by 50 parts by volume of a 70% by volume solution of caustic soda, and then 100 parts by weight of sodium chloride and 100 parts by weight of caustic soda in flakes are added. The diazoamino derivative is precipitated wholly in the form of a paste, then crystallized gradually. The crystals, isolated by filtration, are well pressed and dried at a moderate temperature.

*Example 14*

17.8 parts by weight of the hydrochloride of 100% 4-chloro-2-amino-1-methyl-benzene are brought into solution in 100 parts of water under the action of heat. 20 parts by volume of concentrated hydrochloric acid are added, the solution is cooled to 5° C. and diazotized by the addition of 14 parts by volume of a 50% solution of sodium nitrite. At the end of a quarter of an hour, the diazo-solution obtained, filtered between 0° C. and 5° C., is allowed to flow, drop by drop, under the surface of the liquid of a solution containing 28 parts by weight of sodium N-(dihydroxy-propyl)-2-amino-benzoate and 25 parts by weight of anhydrous sodium carbonate in 150 parts of water. The diazo compound is rapidly and totally absorbed. The mixture is then rendered slightly alkaline to thiazole yellow paper, by the addition of 10 parts by volume of a 48° Bé. solution of caustic soda, and salted out by the addition of 50 parts by weight of sodium chloride. The diazoamino derivative is deposited in the form of a thick yellow oil which is carefully decanted under vacuum in the presence of potash. The yield is of the order of 88%.

The N-(dihydroxy-propyl)-2-amino-benzoic acid of which the sodium salt is used may be made as follows:

275 parts by weight of anthranilic acid are dissolved in 500 parts of water and 120 parts by volume of a 48° Bé. caustic soda solution. 300 parts by weight of an aqueous solution of 74% 1-chloro-2:3-dihydroxy-propane are then added. The mixture is heated progressively to 100° C. while introducing 100 parts by volume of a 48° Bé. solution of caustic soda so as to keep just a weak alkalinity to β-yellow paper. At the end of 4 hours, a further 30 parts by weight of the aqueous solution of 1-chloro-2:3-dihydroxypropane (74%) is added and this addition is renewed at the end of 2 hours. The mixture is kept at 100° C. while adding a further 20 parts by volume of 48° Bé. caustic soda solution. After 6 hours of heating the product of the reaction is estimated with nitrite. The part which absorbs nitrite represents 60% of nitrosated N-(dihydroxypropyl)-2-amino-benzoic acid (with respect to the anthranilic acid used) and 5% of unattacked anthranilic acid. The difference is due to the formation of N-bis-(dihydroxy-propyl)-2-aminobenzoic acid. The solution is used for the preparation of the above diazo-amino derivative as it is without the separation of the product.

*Example 15*

25 parts by weight of 1-amino-4-benzoylamino-2-methoxy-5-methyl-benzene are formed into a paste with 100 parts of water and 14 parts by volume of a 50% sodium nitrite solution. The homogeneous paste is poured into a mixture of 100 parts of water and 30 parts by volume of concentrated hydrochloric acid to which ice is added, so as to ensure that the final temperature does not exceed 10° C. After filtration, this diazo compound is allowed to flow, in 1 hour, at a temperature of between 2° C. and 5° C. under the surface of the liquid of a solution containing 28 parts by weight of sodium N-(dihydroxy-propyl)-2-amino-benzoate, and 25 parts by weight of anhydrous sodium carbonate in 150 parts of water. 14 parts by volume of a 50% NaOH solution of 48° Bé. is introduced simultaneously. Towards the end of the flow a brown oil appears. 150 parts by weight of solid caustic soda are added, and the mixture is stirred slowly. The oil which is entirely precipitated crystallises eventually. It is filtered, pressed out, and dried in vacuo. The yield is of the order of 80%.

*Example 16*

A diazo-solution prepared as in Example 17 from 17.8 parts by weight of the hydrochloride of 4-chloro-2-amino-1-methyl-benzene is introduced in 15 minutes, between 0° C. and 5° C., under the surface of the liquid of a solution containing 28 parts by weight of N-(2'-carboxyphenyl)-β-amino-propionic acid, 200 parts of water, and 26 parts by weight of anhydrous sodium carbonate. To complete the absorption of the diazo compound, 20 parts by volume of a 48° Bé. solution of caustic soda is allowed to flow in slowly, a trace of insoluble matter is filtered, and 300 parts by weight of solid caustic soda are added to the filtrate. The diazoamino derivative which results is well crystallised. It is filtered, pressed, and dried in vacuo at 45° C.

The N-(2'-carboxyphenyl)-β-aminopropionic acid used may be prepared as follows:-

24 parts by weight of β-chlor-propionic acid and 27 parts by weight of anthranilic acid are dissolved in 150 parts of water by the addition of 24 parts by volume of 48° Bé. caustic soda solution. The mixture is heated under reflux while keeping it alkaline to β-yellow paper by the frequent addition of anhydrous sodium carbonate. After 6 hours' heating, the mixture is neutralized by means of hydrochloric acid, and an oil is deposited which crystallises gradually on cooling. After recrystallisation from aqueous alcohol, 22 parts by weight of N-(2'-carboxyphenyl)-β-aminopropionic acid of M. P. 177–178° C. are obtained.

*Example 17*

30 parts by weight of 6-amino-3-benzoylamino-1-methoxy-4-methyl-benzene are formed into a paste with 125 parts of water and 30 parts by volume of concentrated hydrochloric acid. 100 parts by weight of ice are added, and the mixture is diazotized with 16 parts by volume of 50% by volume solution of sodium nitrite. After stirring for an hour, the solution of the diazo-compound obtained is allowed to flow, under the surface of the liquid of a solution prepared from 20 parts by weight of N-ethyl-anthranilic acid, 25 parts by weight of $Na_2CO_3$, 50 parts by weight of NaCl and 150 parts of water. The temperature is kept at about 5–6° C. The absorption of the diazo compound is rather rapid. The mixture is neutralized with caustic soda to thiazole yellow paper, then 100 parts by weight of caustic soda in flakes and 100 parts by weight of common salt are added. After stirring for a night, the crystals are filtered, pressed and dried at moderate temperature. The yield reaches 90%.

*Example 18*

30 parts by weight of 6-amino-3-benzoylamino-1-methoxy-4-methyl-benzene are diazotized as in Example 20. The solution of the diazo-compound is allowed to flow in half an hour, under the surface of the liquid of a solution prepared from 20 parts by weight of N-methyl-anthranilic acid, 30 parts by weight of $Na_2CO_3$, 50 parts by weight of NaCl, 150 parts of water, and 150 parts by weight of ice. At the end of the flow, no free diazo compound remains. The diazoamino derivative has partially precipitated. Its precipitation is brought about by means of 50 parts by weight of common salt and 100 parts by weight of caustic soda in flakes. After 2 hours stirring, it is filtered, pressed, and dried at a moderate temperature. The yield is excellent.

We claim:

1. A diazoamino derivative selected from those having the following general formula:

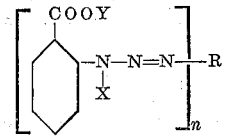

in which Y represents a member selected from the group consisting of hydrogen atoms and alkali metals, X represents a member selected from the group consisting of unsubstituted alkyl radicals and alkyl radicals substituted by a member of the group consisting of the carboxy, COOAlkyl, and $CONH_2$ groups, the said alkyl groups having not more than three carbon atoms, R represents the residue of an amine selected from the group consisting of the chlorotoluidines, chloranilines, chloranisidines, aminoazotoluenes, nitro- and methoxy-substituted aminoazotoluenes, nitro-, methoxy- and chloro-substituted aminoazotoluenes, nitro-, methoxy- and methyl-substituted aminoazotoluenes, benzoylamino-methylanisidines, in which case $n$ is 1, and dianisidines, in which case $n$ is 2.

2. The diazoamino derivative of the formula:

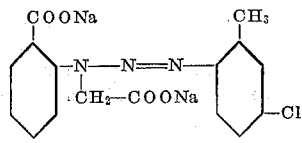

3. The diazoamino derivative of the formula:

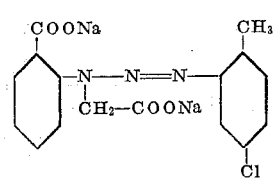

4. The diazoamino derivative of the formula:
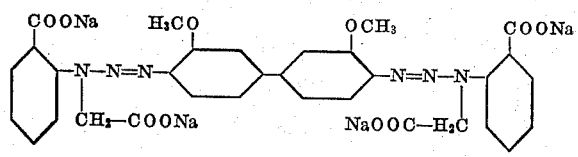
5. The diazoamino derivative of the formula:
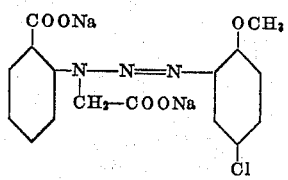
6. The diazoamino derivative of the formula:
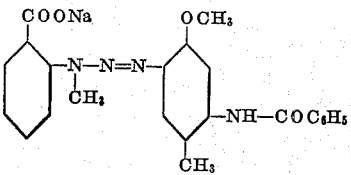
References Cited in the file of this patent
UNITED STATES PATENTS
| | | |
|---|---|---|
| 2,078,387 | Kern | Apr. 27, 1937 |
| 2,124,594 | Schmelzer | July 26, 1938 |
| 2,168,800 | Kracker et al. | Aug. 8, 1939 |
| 2,522,838 | Petitcolas et al. | Sept. 19, 1950 |
| 2,572,916 | Denton | Oct. 30, 1951 |
| 2,675,374 | Petitcolas et al. | Apr. 13, 1954 |